No. 730,180. PATENTED JUNE 2, 1903.
W. VREDENBURG.
GUARD FOR WAGON HUBS.
APPLICATION FILED FEB. 24, 1903.
NO MODEL.

Witnesses
A. Allgier
Nellie Cilley

Inventor.
William Vredenburg
By Ithiel J. Cilley
Attorney.

No. 730,180. Patented June 2, 1903.

UNITED STATES PATENT OFFICE.

WILLIAM VREDENBURG, OF GRAND RAPIDS, MICHIGAN.

GUARD FOR WAGON-HUBS.

SPECIFICATION forming part of Letters Patent No. 730,180, dated June 2, 1903.

Application filed February 24, 1903. Serial No. 144,893. (No model.)

*To all whom it may concern:*

Be it known that I, WILLIAM VREDENBURG, a citizen of the United States, residing at Grand Rapids, in the county of Kent and State of Michigan, have invented certain new and useful Improvements in Guards for Wagon-Hubs, of which the following is a specification.

My invention relates to improvements in dust-guards for use upon the hubs of wagons; and its objects are, first, to provide a light sightly guard that will absolutely avert the danger of dust and gravel working in and around the skeins in a vehicle-wheel, and, second, to provide a dust-guard that will adjust itself to slight variations in the circumference of wheel-hubs. I attain these objects by the mechanism shown in the accompanying drawings, in which—

Figure 1:
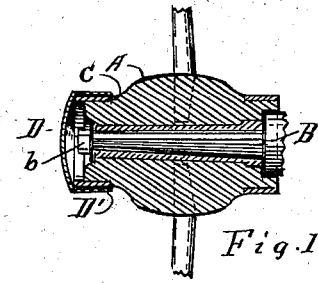
Figure 2:
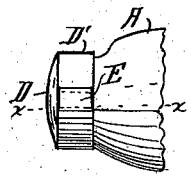
Figure 3:
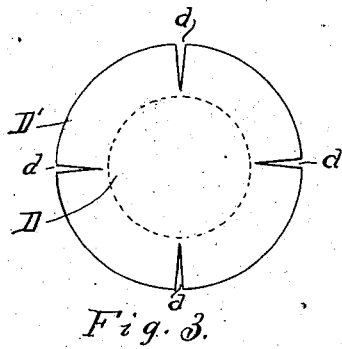
Figure 4:
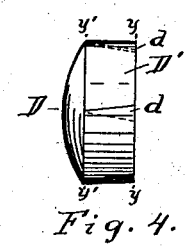
Figure 5:
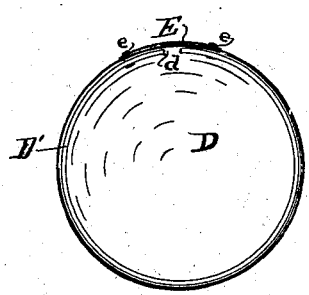

Figure 1 is a longitudinal section of a wagon-hub and of the guard hereinafter described on the line X X of Fig. 2. Fig. 2 is an elevation of one end of a hub with the guard in place and showing a rubber or elastic attachment for drawing the divided edges of the rim of the guard together. Fig. 3 is a plan of a blank from which the guard is formed. Fig. 4 is an elevation of a guard, showing several openings and laps; and Fig. 5 is a back elevation of the same, showing the application of the rubber or elastic strip at one of the openings or laps.

Similar letters refer to similar parts throughout the several views.

This guard is made, preferably, of sheet-steel pressed to form on proper dies, and in its normal condition the internal diameter of the rim D' at the line $y\ y$ should be somewhat shorter than the diameter of the steel band C on the end of the hub A, and for the purpose of making it adjustable to enter over and clamp safely upon this band I form one or more openings in the rim, as shown at $d\ d$, and taper the rim, so that the diameter on the line $y\ y$ is slightly shorter than that on the line $y'\ y'$, so that in forcing the guard over the band C the edge of the rim at $y\ y$ will clamp snugly upon the band. There may be one or more of the openings $d$ in the rim, and they may be so made that when the rim is formed the edges will lap by and make dust-proof joints, and to insure a perfectly dust-proof joint and clamping the guard properly upon the hub a short piece of elastic rubber E may be riveted to each edge of the rim near the openings, as indicated at $e\ e$ in Fig. 5, to cover the opening and draw the edges in such a manner as to cause the rim to more securely clamp around the hubs.

The outer end of the guard should be made convex, as shown at D in Figs. 1 and 2, as this form adds much to the clamping qualities of the rim and also greatly averts the danger of being jammed out of shape, besides adding to the contour and sightliness of the guard.

In Fig. 1, B represents the end of the axletree and the journal portions of the skein, and $b$ represents the nut or bur that secures the hub upon the axletree.

The advantages of making this guard of metal over the use of any other material are, first, it holds its form better; second, if the complete guard was made of elastic rubber, or if even the entire rim was made of elastic rubber and a metal protecting-strip placed over the exposed end, it would be so inconvenient to remove it from and to place it upon the hub that the public would at once discard it, and, besides this, the cost would be so great and the danger of cutting and entirely ruining it by the hub coming in contact with any hard substance—as a tree, stump, or a stone—that its utility would be utterly destroyed, while with metal the very short piece of rubber, if any, necessary to insure a perfect adherence of the guard to the hub and its well-guarded position upon the rim renders it practically inexpensive and reduces the danger of its destruction, as hereinbefore suggested, to the minimum, thus providing a practically indestructible and efficient guard at a price that makes it attractive to and within the reach of all others.

Having thus fully described my invention, what I claim as new, and desire to secure by Letters Patent of the United States, is—

1. In a dust-guard for hubs of wagon-wheels, a metal cup-shaped guard having a rim with openings at one or more places, and a spring or elastic rubber secured to the rim at each side of the opening, substantially as and for the purpose set forth.

2. In a dust-guard for the hubs of vehicles, a metal cup-shaped guard having a rim with one or more openings, the diameter of the rim shorter at the edge than at the base and the edges of the rim lapping by each other at the opening, and a convex base, substantially as and for the purpose set forth.

Signed at Grand Rapids, Michigan, February 19, 1903.

WILLIAM VREDENBURG.

In presence of—
NELLIE CILLEY,
ITHIEL J. CILLEY.